United States Patent [19]

Schiffmacher

[11] Patent Number: 5,040,477
[45] Date of Patent: Aug. 20, 1991

[54] WARNING DEVICE FOR COMPRESSED AIR TANKS

[76] Inventor: John A. Schiffmacher, 15006 Winterwind Dr., Tampa, Fla. 33624

[21] Appl. No.: 497,667

[22] Filed: Mar. 23, 1990

[51] Int. Cl.⁵ .................. G01L 19/12; B63C 11/02; B63C 11/22; F17C 13/02
[52] U.S. Cl. .................. 116/70; 116/203; 137/557
[58] Field of Search .......... 116/70, 203; 137/557; 367/143, 141

[56] References Cited

U.S. PATENT DOCUMENTS

| | | | |
|---|---|---|---|
| 3,056,378 | 10/1962 | Simmonds | 116/70 |
| 3,149,752 | 9/1964 | Gagnan et al. | 116/70 |
| 3,244,196 | 4/1966 | Replogle | 137/557 |
| 3,719,160 | 3/1973 | Christianson | 116/70 |
| 3,811,400 | 5/1974 | Smilg | 116/70 |
| 4,249,473 | 2/1981 | Pasternack et al. | 116/70 |
| 4,275,681 | 6/1981 | Ragavan et al. | 116/70 |
| 4,275,723 | 6/1981 | Warncke et al. | 116/70 |
| 4,487,155 | 12/1984 | Olesen | 116/70 |
| 4,825,802 | 5/1989 | Le Bec | 116/70 |
| 4,950,107 | 8/1990 | Hancock et al. | 116/26 |

*Primary Examiner*—William A. Cuchlinski, Jr.
*Assistant Examiner*—C. W. Fulton
*Attorney, Agent, or Firm*—Larson and Taylor

[57] ABSTRACT

A warning device for use with tanks of compressed air which device will automatically generate an audible warning signal that can be heard under water or in other noxious gas or in oxygen-depleted environments when the air pressure in the tank reaches a predetermined low pressure level.

8 Claims, 3 Drawing Sheets

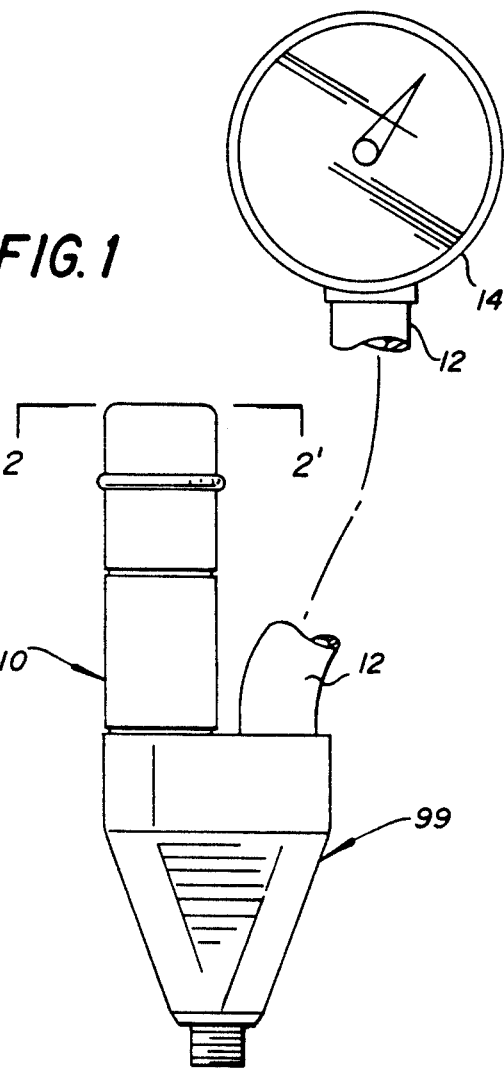
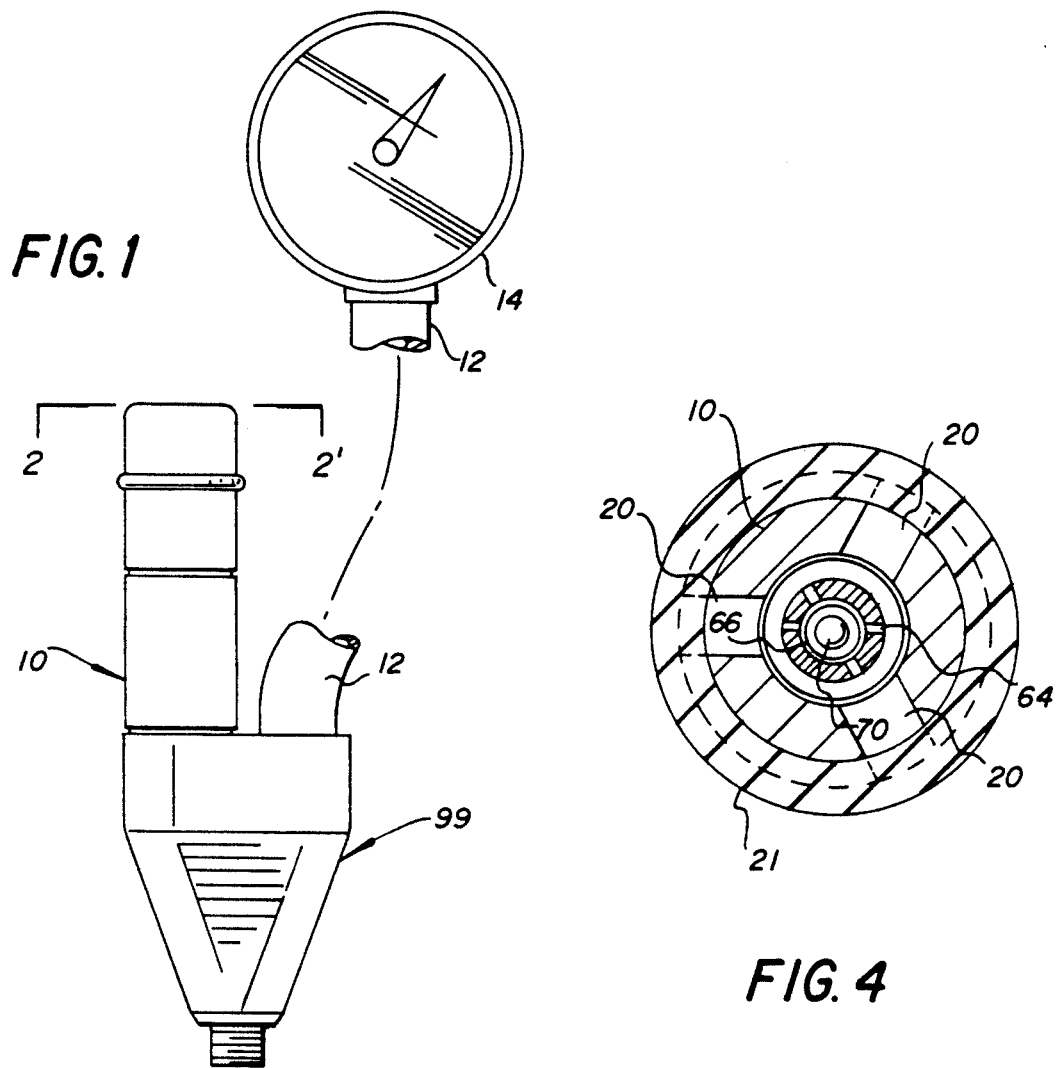
FIG. 1
FIG. 4
FIG. 3

WARNING DEVICE FOR COMPRESSED AIR TANKS

FIELD OF THE INVENTION

This invention relates to a warning device for use with breathing apparatus compressed air tanks providing an air supply for breathing which device automatically generates an audible warning signal when the air pressure in the air tank has been reduced to a predetermined low pressure level.

BACKGROUND OF THE INVENTION

Tanks of compressed air are commonly employed to provide the necessary air supply for breathing when used in oxygen deficient environments such as underwater and in noxious gas or oxygen-depleted atmospheres. Underwater diving systems and fire fighting systems are but two examples of equipment utilizing compressed air tanks.

Although safety courses are available for amateur divers, a diver can become disoriented easily under water. The diver is in an environment which is very different from his normal environment on land. It is strange to him, particularly in the early stages of the learning process. Thus, it is not surprising that divers frequently forget to look at their watches or air pressure gauge and lose track of their position. If a diver becomes confused, it is not uncommon for him to suffer panic and consume more than the usual amount of air. He becomes inattentive to the time which has elapsed since the dive began and thus loses track of his air supply, which may not be sufficient to return him to the surface or to a safe place on the surface. Even if he reaches the surface, he can drown from physical exhaustion if the air supply is depleted and he is not sufficiently close to land or a boat. The watchword for divers is "plan the dive and dive the plan".

Similarly, firefighters are often placed in environments such as smoke-filled rooms wherein they are unable to see either their watches or a visual signal announcing a reduction in air supply. Just as often they become so involved in completing the critical work at hand that they forget or lose cite of the time elapsed. In so doing they unknowingly subject themselves to a physically injurious, if not fatal, situation.

If the user becomes confused or is excited, it is not uncommon for him to panic and consume more than the usual amount of air thus depleting his supply faster than anticipated. Also, under such circumstances the user often becomes inattentive to the time which has elapsed and loses track of his air supply, which may not be sufficient to return to a safe atmosphere.

Previous attempts to develop a reliable warning device that automatically generates an audible warning signal when the tank air pressure has been reduced to a predetermined low pressure have been unsuccessful. The prior art warning devices, for whatever reason, fail sooner or later to give off the desired audible signal when the predetermined supply level has been reached. Needless to say that an unreliable self-contained breathing apparatus (S.C.B.A.) warning device is a useless warning device.

Accordingly, it is an object of the invention to provide a new and improved warning device for underwater diving equipment or fire fighting equipment and the like, that automatically transmits a signal under water or in a noxious gas atmosphere which will capture the wearer's attention, indicating that a predetermined supply of air remains in the air tank and that he should take action for his personal safety.

It is another object of the invention to provide such a warning device which generates a sound signal that can be readily heard underwater.

It is another object of the invention to provide such a warning device which can be quickly and easily adjusted to a selected trip point so that the warning device will respond to the remaining air supply as predetermined by the wearer or user, indicating a critical point in a diving or working plan.

It is a further object of the invention to provide a new and improved warning device which device can be readily affixed to the users existing equipment without substantial modifications.

Yet another object of the invention is to provide a warning device designed for use in conjunction with conventional air tank pressure gauges and serving as a back warning system such pressure gauges.

SUMMARY OF THE INVENTION

These and other objects of the invention are obtained by the warning device described herein that includes a housing coupled to the air tank that contains air under pressure. The housing has an upper chamber with air escape passages and a lower chamber separated from the upper chamber by an interconnecting section such as a neck. Air from the tank creates pressure on the surface of a calibrating member in the lower chamber. The calibrating member is threaded to a hollow piston rod which extends upward from the lower chamber through the interconnecting section and is affixed to a hollow piston in the upper chamber. The pressure on the surface of the calibrating member moves the calibrating member and the attached rod and piston upward against the force of a primary spring in the lower chamber. The hollow piston rod has a radially extending orifice that is positioned above a sealing ring located in the interconnecting section of the housing when the air pressure in the tank is high. The sealing ring prevents air from escaping from the lower chamber into the upper chamber under the high pressure condition. Preferably the radially extending orifice is positioned between two sealing rings when the tank pressure is high.

The calibrating member is adjusted on the piston rod against the tension of the primary spring to establish a safety level trigger point for actuating the warning device. The calibrating member can be set to actuate the warning device when the air tank pressure is reduced to a predetermined level such as 300 pounds per square inch, for example.

When the air pressure in the tank has decreased to the predetermined safety level, the spring pressure on the calibrating member from the primary spring moves it and the accompanying piston rod downward. The orifice in the piston rod is now moved below the sealing ring or rings and is exposed to the lower chamber. Air moves from the lower chamber into the orifice. A valve member is located inside a movable tubular sleeve in the piston and sits on valve seats whose edges are tapered or beveled to form a seat for the valve member. At least a portion of the value member has a value surface that sits and is pressed against the tapered or beveled edge by a secondary spring inside the piston. The tubular sleeve is constructed from a synthetic plastic material having an Izod Impact Strength at 73° F. of at least about 7 ft.-lbs. per inch; a Rockwell Hardness at 73° F. of at least about 100 and a Coefficient of Thermal Expansion of at least about 5.0 in./in./° F. The preferred plastic material for the hollow sleeve is acrylonitrile/butadiene/styrene resin. As used herein and the appended claims, the properties Izod Impact Strength, Rockwell Hardness and Coefficient of Thermal Expansion are measured by the following test methods:

| Izod Impact Strength | ASTM D-256' |
| --- | --- |
|  | (Method A) |
| Rockwell Hardness | ASTM D-785 |
| Coefficient of Thermal Expansion | ASTM D-69 |
| Flexural Yield Strength | ASTM D-790 |

It has been found that a synthetic plastic material of the foregoing properties is critical to the formation of a reliable audible warning device. Attempts to use metals or synthetic plastics which do not meet these specifications for the tubular sleeve have failed to produce a dependable warning device. Apparently, sleeves of metal tend to scratch, dent, corrode, etc. resulting in leaks that cause failure. Similarly, sleeves of plastics which do not possess these physical properties tend to scratch or become misshaped, etc., again resulting in air leaks that cause failure.

In operation air moves up the passage in the hollow piston rod against the valve member inside the piston and when the pressure builds up sufficiently moves the sleeve and valve member upward until the sleeve abuts a stop inside the piston. The air pressure continues to move the valve member upward and it lifts from the valve seat compressing the secondary spring and permitting entry of the air into the hollow central portion of the piston. The air then moves through radial passages in the piston into air escape passage in the housing and against a resilient exhaust valve member positioned on the outside of the housing so as to cover the air escape passages. The air pressure causes the exhaust valve member to open and let a small amount of air to escape to the outside environment, e.g., water. After the air escapes, the ring quickly snaps back to the closed position shutting off the air escape passages and preventing contaminants such as water and noxious gases from entering the device.

When the air pressure lifts the valve member off the valve seat and the air rushes into and out of the hollow portion of the piston, the air pressure in the lower chamber is reduced to a level at which the compressed secondary spring returns the valve member onto the tapered internal ridge of the hollow sleeve temporarily closing off access to the upper chamber. Air pressure in the lower chamber and beneath the valve member then immediately builds up quickly to where it again lifts the valve member off the ridge thereby opening the upper chamber to air releasing the pent-up air pressure. This opening and closing action, that is, seating and unseating of the valve member, repeats resulting in the valve member undergoing a bouncing action that causes an audible, intermittent popping sound that can be clearly heard even under water. The diver or fire fighter is now continually warned that he has reached his predetermined safety supply of air. As the air supply decreases further, the frequency of the pulsating, popping sound diminishes and gives a further indication of the status of the air supply.

DESCRIPTION OF THE DRAWINGS

FIG. 1 is an elevational view illustrating the warning device of the invention installed between a driver's air tank hose and a pressure gauge.

FIG. 3 is a sectional view taken along line 3—3' of FIG. 2.

FIG. 4 is a sectional view taken along line 4—4' of FIG. 2.

DETAILED DESCRIPTION OF THE INVENTION

Referring to FIG. 1 of the drawings, the embodiment of the invention shown therein contains a housing 10 threaded to a hose coupler indicated generally as 99. Hose coupler 99 has a hose 12 connected to a gauge 14.

Figure 2:
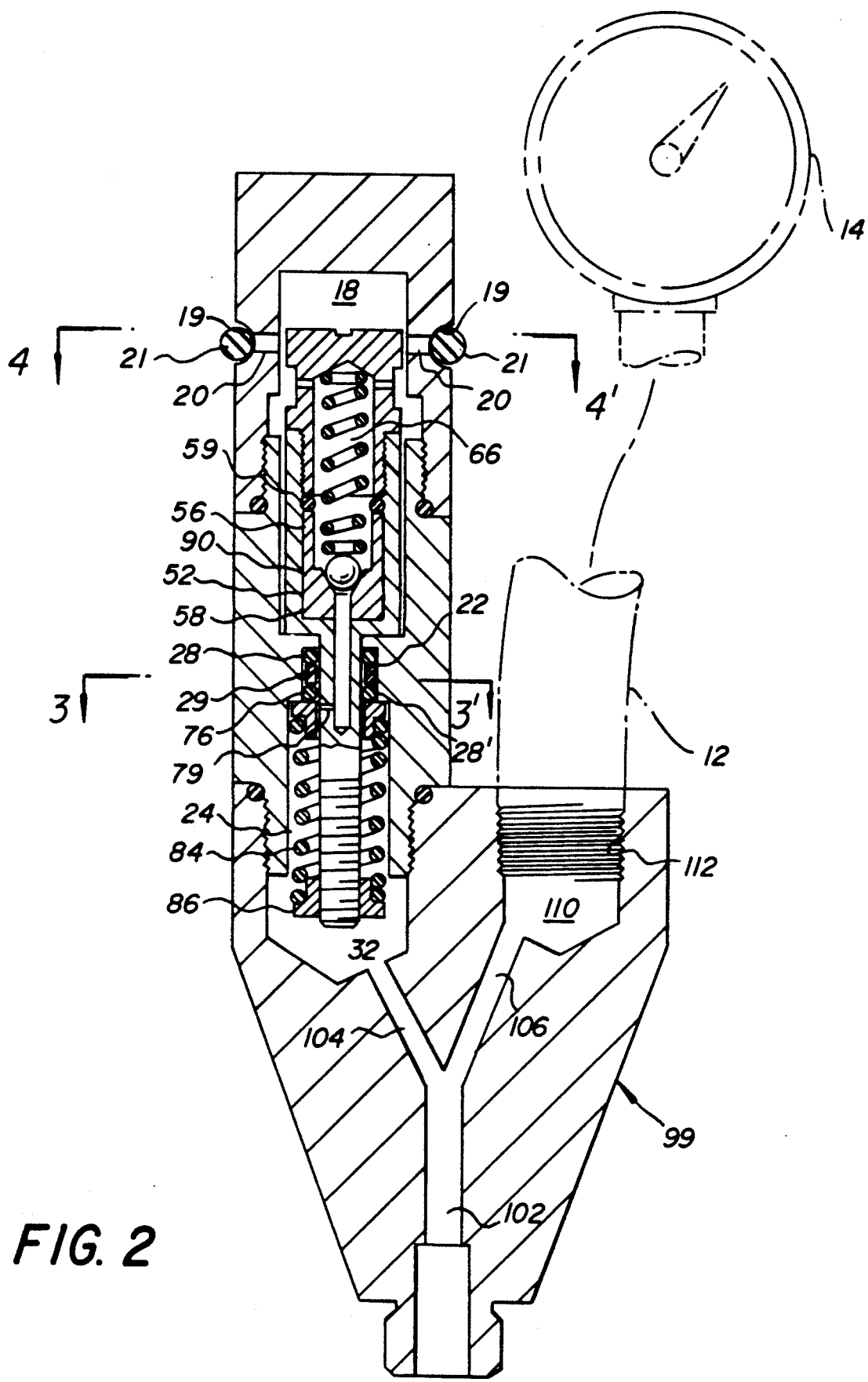
FIG. 2 is an enlarged sectional view taken along line 2—2' of FIG. 1, showing the valve in the low pressure position but before activation.
Figure 5:
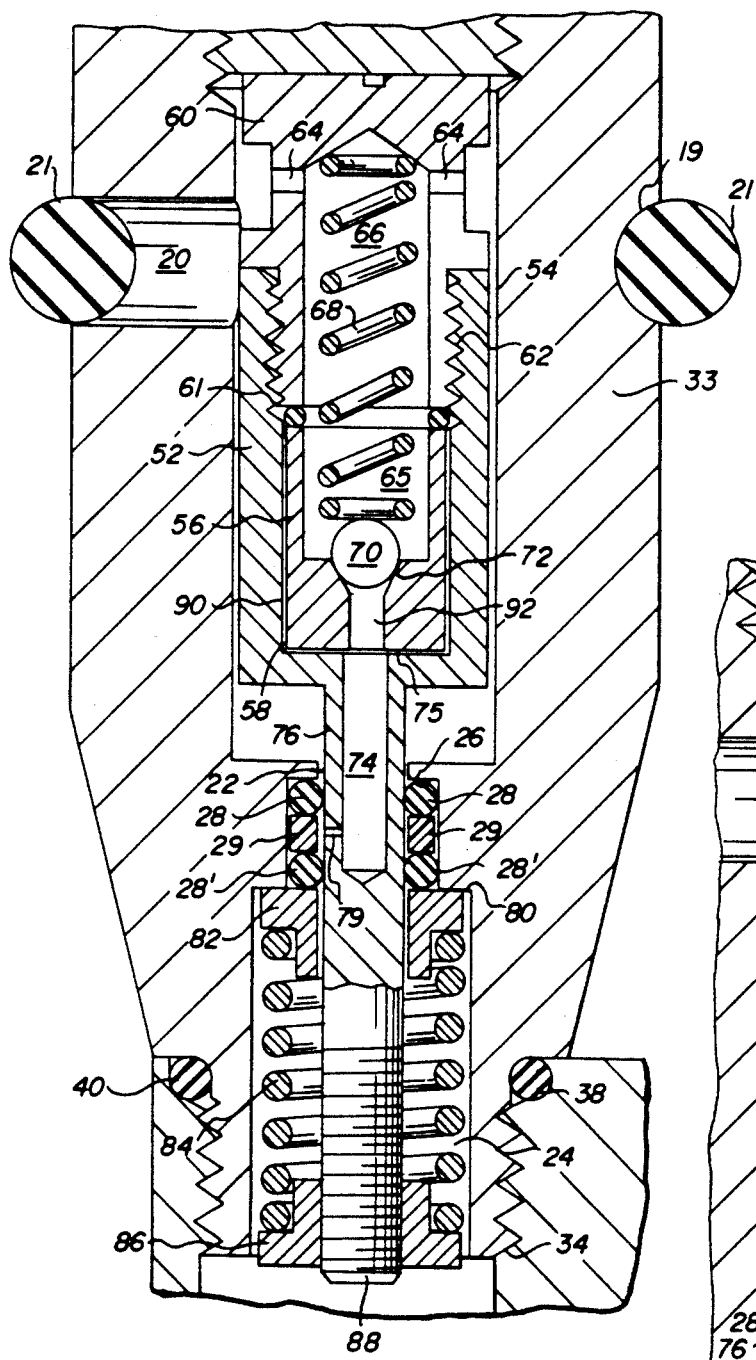
FIG. 5 is a further enlarged portion of FIG. 2 showing the valve in the safe or high pressure position.

As particularly shown in FIGS. 2 and 5 of the drawings, the housing 10 includes an upper chamber 18 with radial openings 20 that open into the ambient environment. An O-ring seal 21 fits into a groove 19 which surrounds housing 10 and closes off openings 20. The upper chamber extends into a neck at the bottom to form a passage 22 opening into lower chamber 24. The neck forms a shoulder 26 which seats an O-ring seal 28. A second O-ring seal 28' is situated below the first O-ring seal 28 and a plastic ring 29 is positioned between the seals 28' and 28 to load them in position. The lower chamber 24 opens into area 32 in the hose coupler 99. Hose coupler 99 contains a main passageway 102 which forks into a passageway 104 and a passageway 106. Passageway 104 communicates with lower chamber 24 via area 32. The end of passageway 106 opens into chamber 110 the top end 112 of which is threaded for engagement to hose 12 that connects to gauge 14.

Figure 6:
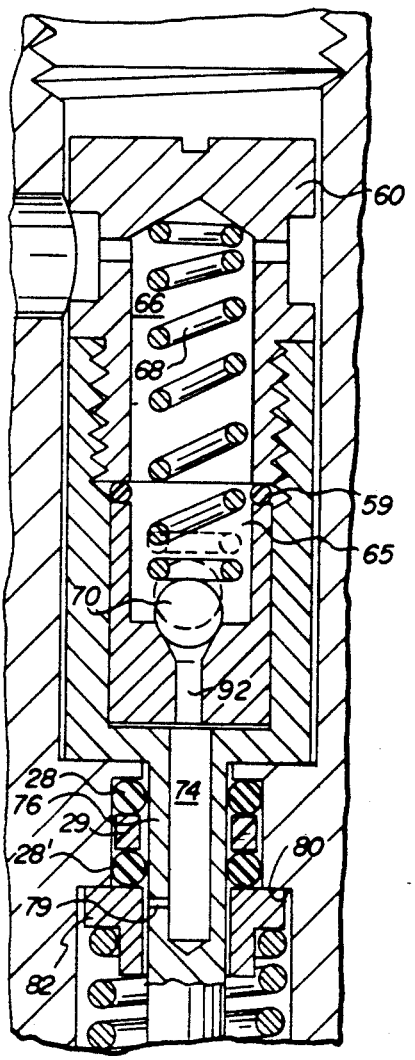
FIG. 6 is a view showing the valve in the low pressure position during activation.

A piston 52 is disposed in upper chamber 18. The piston has an internal compartment 65 within which is positioned a tubular plastic sleeve 56, formed of a plastic material having the properties hereinbefore defined. Sleeve 56 contains a circumferential internal valve seat section 90 the upper end 91 of which is tapered or beveled to serve as a valve seat for a ball valve member 70. Preferably, seat 90 is disposed a short distance from the bottom of sleeve 56 and opens to passageway 92 within the sleeve. Excellent results have been obtained when the sleeve is formed from an acrylonitrile/butadiene/styrene resin manufactured by Borg-Warner Corporation under the trademark Cycolac OSE. This synthetic plastic material has an Izod Impact Strength at 73° F. of 7 ft.-lbs./in.; a Hardness (Rockwell R) at 73° F. of 102; a Coefficient of Thermal Expansion of 5.3 in./in./° F. (x $10^{-5}$) and a Flexural Yield Strength at 73° F. at 10,700 psi. The sleeve forms a chamber 65 that communicates with valve seat section 90. Cap 60 is threaded to piston 52 at 62 and forms the crown of the piston. A clearance 61 is established between the bottom of cap 60 and the top of sleeve 56 as shown in FIG. 6. An O-ring 59 is disposed in clearance 61 as a seal. Cap 60 has radial openings 64 extending between openings 20 in housing 10 and the enclosure 66 formed by the cap 60 and the sleeve 56. The openings 20 are covered by exhaust O-ring 21 which is made from a resilient material such as Butyl rubber. If desired, an additional exhaust ring can be provided so as to cover openings 64 as well.

Upper or secondary spring 68 is positioned in enclosure 66 and one end of the spring abuts the cap 60. The other end of spring 68 extends into chamber 65 and engages ball valve 70. Ball valve 70 has a spherical valve face 72 which is normally seated onto the valve seat forms by beveled edges of ridge 90 and maintains there the force of upper spring 68. Rod 76 extends downward from piston 52 and has a central opening 74. Rod 76 has an orifice 79 therein positioned opposite plastic ring 29 when the valve is in the closed position.

Lower chamber 24 includes a stepped portion which provides a shoulder 80 that seats spring retainer 82. One end of lower or primary spring 84 contacts the retainer 82 and the other end of the spring contacts calibrating nut 86 which is threaded to the piston rod 76 as shown at 88.

OPERATION OF THE INVENTION

FIG. 5 of the drawings illustrates the inventive device as arranged when the diver's air tank is full (high pressure). Calibrating nut 86 is adjusted on piston rod 88 against the force exerted by lower spring 84 to store energy in the spring. The force exerted by the spring as established by this energy sets the safety pressure level of the device. A full air tank will ordinarily have 1800 to 3500 pounds per square inch air pressure and a typical safety level in the air tank is three hundred pounds per square inch for example.

Air pressure from the diver's tank (not shown) flows through lower chamber 24, is exerted against the calibrating nut 86, and moves piston 52 against the force of lower spring 84. A full tank of air has sufficient pressure to compress lower spring 84 and move piston 52 against the top of upper chamber 18. In this position, sleeve 56 rests on O-ring 59 so that a gap 61 is left between the top of sleeve 56 and the bottom of cap 60. Gap 61 is essential to the initiation of the seating and unseating, i.e., bouncing action, of valve member 70 described below when the air tank pressure drops below the preset pressure. Air is prevented from flowing from the lower chamber 24 to the upper chamber 18 by the O-ring seal 28' and O-ring 28 prevents air flow into upper chamber 18 except through orifice 79.

As the air from the diver's tank is consumed by the diver, the pressure in the tank decreases and this in turn decreases the pressure against the calibrating nut 86. As the pressure against calibrating nut 86 decreases, the energy stored in spring 84 forces the calibrating nut 86 downward, and since the nut is affixed to the piston rod 76, the piston 52 also moves downward. When the force of spring 84 exceeds the safety level of pressure in the tank, the piston 52 gradually drops downward moving orifice 79 in piston rod 76 below the O-ring seal 28' and in the lower chamber 24 as shown in FIGS. 2 and 6. Eventually piston 52 seats against the bottom of upper chamber 18.

When the orifice 79 is below the seal 28', air flows from the lower chamber 24 through the clearance between piston rod 76 and spring retainer 82, through orifice 79, into opening 74 of rod 76 and up into space 92 below the ball 70 where it builds up. When the pressure is sufficient, it moves the sleeve 56 the bottom 75 as shown in FIG. 6 and the upper end of the sleeve against the bottom of cap 60. The air pressure then lifts ball 70 off the ridge 90 against the force of upper spring 68 as shown in phantom in FIG. 6. Thus, the valve face 72 of ball 70 is removed from the closed position and air flows through passageway 92 in the bottom of sleeve 56 into the enclosure 66. The air then flows from the enclosure 66 through radial passages 64 in the cap 60, through openings 20 and against the resilient exhaust valve ring 21. The valve ring 21 opens slightly thereby permitting air in openings 20 to escape out of housing 10.

After a small amount of air escapes, the resilient exhaust valve ring 21 quickly snaps shut to close off the air passages 20 and prevents water from entering the system. The release of air into the chamber 65 reduces the pressure in the lower chamber 24 and space 75 thereby causing spring 68 to reseat ball 70 and force spherical valve face 72 onto the valve seat formed by ridge 90. The air pressure in the lower chamber 24 and space 75 immediately builds up again and lifts ball valve 70 off the valve seat. The alarm is now activated and the closing and opening, i.e., seating and unseating of ball valve 70, repeats while the piston remains in the position shown in FIG. 6, thereby imparting a "bouncing action" to the ball valve 70 which causes a pulsating "popping" sound. The popping sound is clear and intermittent and much more detectable than a continuous sound signal. The diver or fire fighter now knows that his air supply is getting low and that he should return to the surface. As the air supply is further depleted, the frequency of the popping sound decreases, giving an additional indication of the air supply situation.

The size of orifice 79 is important in establishing the popping sound and controlling the size of escaping air bubbles. The hole diameter should be such that it provides an air flow sufficient to pop or bounce the ball valve off the O-rings seat but insufficient to keep the ball continuously off the seat. A satisfactory orifice is in the range of 0.002 to 0.005 inch in diameter. An optimum size has proven to be about 0.0039 inch. The orifice is also large enough to avoid inordinate clogging and small enough to limit the amount of escaping air so as not to unduly waste it.

The small orifice also limits the size of the escaping air bubbles. Divers ordinarily use an anchor line with recognizable depth increments thereon. More than one diver may be ascending the line at the same time and slowing their ascent or pausing to avoid physical or mental damage due to a rapid change of pressure. If a diver in a lower position on the line generates large air bubbles, this tends to confuse the diver or divers above him. Such confusion can cause a diver to lose his concentration and risk the chance of disorientation or a too rapid ascent.

The invention has been described in the form of the presently preferred embodiments. It will be appreciated by those skilled in the art that variations from these embodiments can be made without departing from the scope of the invention. For instance, although the present invention has been described using an embodiment employing a ball valve it should be understood that other types of valves can be employed in place of the ball valve provided that at least a portion of the valve member has a surface which rests on the tapered ridge.

It is claimed:

1. A warning device for use with a compressed air tank providing an air supply for breathing, comprising:
   a housing having a lower chamber for connecting to the air in a compressed air tank;
   an upper chamber in said housing with air escape passages therein and separated from said lower chamber by an interconnecting section, said interconnecting section having sealing means therein;

a hollow piston slidably disposed in said upper chamber with air passages extending from its interior to its exterior;

exhaust valve member for closing said air escape passages;

a hollow rod on one end of said piston extending through said interconnecting section into said lower chamber, said hollow rod including an air channel from the interior to the exterior thereof and a pressure means on the end thereof;

first spring means in said lower chamber for engaging said hollow rod and moving said hollow piston to the bottom of said upper chamber when the air pressure in the lower chamber is below a predetermined pressure level, said hollow rod being in a position whereby said air channel is away from said sealing means to the open position, said air channel being sealed by said sealing means when the air pressure in the lower chamber is above said predetermined pressure level and moves said pressure means, hollow rod and hollow piston upward against he force of said first spring means;

a valve member;

a hollow sleeve open at each end slidably disposed in said piston, said hollow sleeve having within its lower end an internal a valve seat having tapered edges forming a seat for said valve member, said hollow sleeve being constructed of a synthetic plastic material having an Izod Impact Strength at 73° F. of at least about 7 ft. lbs. per inch, a Rockwell Hardness at 73° F. of at least about 100, a Coefficient of Thermal Expansion of at least about 5.0 in./in./° F. and a Flexural Yield Strength of at least about 10,000 psi at 73° F.;

second spring means inside said hollow piston and said hollow sleeve contacting said valve member for seating said valve member on the said valve seat;

whereby when the air pressure in the lower chamber is below said predetermined pressure level, the said first spring means moves said air channel in said hollow rod to the open position away from said sealing means, air flows through said air channel to move said valve seat and said hollow sleeve off the bottom of said hollow piston and lift said valve member off said valve seat to pass air through said air passages in the piston, open said exhaust valve member and permit air to flow out of said housing, whereupon said valve member is moved down by said second spring means to reseat on said valve seat, such seating and unseating action repeating and causing an audible popping sound.

2. A warning device according to claim 1 wherein the air channel is on the order of 0.002 to 0.005 inch in diameter.

3. A warning device according to claim 2 wherein the air channel is on the order of about 0.0039 inch in diameter.

4. A warning device according to claim 1 wherein the pressure means is adjustable on said rod for setting the energy stored in said first spring means and thus the predetermined air pressure level which will actuate the warning device.

5. A warning device according to claim 1 wherein said valve member comprises a valve element at least a portion of which has a spherical surface and said valve seat is a tapered circumferential edge which seats said spherical surface.

6. A warning device according to claim 5 wherein said valve member is a ball.

7. A warning device according to claim 1 wherein the hollow sleeve is constructed from an acrylonitrile/butadiene/styrene resin.

8. A warning device according to claim 7 wherein the acrylonitrile/butadiene/styrene resin has an Izod Impact Strength at 73° F. of about 7.0 ft.-lbs./in., Rockwell Hardness at 73° F. at 102, a Coefficient of Thermal Expansion of 5.3 in./in./° F. (x $10^{-5}$) and a Flexural Yield Strength of 10,700 psi at 73° F.

* * * * *